United States Patent Office 3,173,898
Patented Mar. 16, 1965

3,173,898
POLYMERIZATION OF POLYAMIDE-FORMING REACTANTS WITH HYPOPHOSPHITE CATALYSTS
Wei Men Sum, Wilmington, Del., assignor to E. I. du Pont de Nemours and Company, Wilmington, Del., a corporation of Delaware
No Drawing. Filed Mar. 20, 1961, Ser. No. 96,703
9 Claims. (Cl. 260—78)

This invention relates to funicular structures of polyamides and to a process for preparing high molecular weight polyamides which can be spun and drawn to high quality yarns. In particular, it relates to catalysts which increase the rate of formation of the polyamides without deleteriously affecting processability in subsequent yarn spinning and drawing operations.

This application is a continuation-in-part of my copending application Serial No. 712,673, filed February 3, 1958, now abandoned.

Polymerization of suitable diamines with dicarboxylic acids are well known in the art and are of considerable commercial significance. Attempts to increase the rate of polyamidation reactions have been reported. U.S. Patent No. 2,564,001 to M. Genas teaches the use of hypophosphorous acid or of ammonium hypophosphite or sodium hypophosphite as catalysts for polymerization of amino acids. One disadvantage of such prior art processes is that the catalysts in yarns from polyamides thus prepared are subject to degradation with a corresponding deleterious effect on the processability of the yarn in spinning and drawing operations. Yarn containing a hypophosphite at concentrations of 0.5 to 9 mole percent as taught in this prior art patent shows high defect frequencies and unacceptable drawing performance. Defects are non-uniformities such as nubs and broken filaments.

U.S. Patent No. 2,345,700 to Henry Dreyfus teaches the addition of a metal salt of carboxylic, sulphocarboxylic, phosphoric, phosphonic, or sulphonic acid to the polymerization reactants in order to withstand spinning conditions whereby polymers tend to further polymerize or to decompose. Among the disadvantages of this process is that it increases the polymerization time to the uneconomical length of about 7 hours.

U.S. Patent No. 2,557,808 to Isaac F. Walker teaches a process for increasing the melt viscosity of synthetic linear polyamides by vacuum melt blending a synthetic linear polyamide with a member of the class consisting of polybasic acids higher than dibasic, their anhydrides, esters, amides, and salts. Walker's process increases total melt viscosity through cross-linking or branching (but not primarily through polymerization) by using additional and expensive steps, for it is a requirement of the process that the said member be mixed with the already-polymerized material, and that the mixture be held under a vacuum and at a temperature above the melting point of the polyamide. Therefore, the over-all polyamidation time is actually increased with Walker's process.

It is an object of this invention to provide catalysts which in low concentration increase the rate of polyamidation of suitable diamines with dicarboxylic acids.

It is another object of this invention to provide a process for catalytic polymerization of suitable diamines with dicarboxylic acids using specific catalysts that do not induce, nor are involved in, degradative or cross-linking side reactions.

It is still another object of this invention to provide a process for catalytic polymerization of suitable diamines with dicarboxylic acids at reduced polymerization time resulting in a yarn with good processability and low defect frequency in subsequent drawing operations.

Other objects of this invention, and the means for their attainment, will be obvious from the following description.

These objects are accomplished by the following invention, wherein I have found that presence of hypophosphites, of the metals of Group 2 of the Periodic Chart of the Elements (Handbook of Chemistry and Physics, 42nd edition, pp. 448–9) with atomic weights between 23 and 138, in concentrations from about 0.002 to about 0.2 mole percent, markedly increases the rate of polyamidation and results in polyamides readily spinnable into yarn with good processability and low defect frequency in both spinning and drawing. The elements so designated are Ca, Sr, Ba, Mg, Zn, and Cd. The preferred catalysts are strontium hypophosphite and zinc hypophosphite. Hypophosphites outside the scope of this invention, such as those derived from Group 1 and Group 3 metals, increase the rate of polymerization but results in unacceptable spinning and drawing performance even when applied in the said low concentration range.

Increase in polymerization rate is substantially proportional to the molecular concentrations of catalyst for all hypophosphites regardless of their cation, as long as the catalyst does not degrade, and can be followed by high viscosity measurement. Usual additives may be added to the polymerization mixture if desired. For example, a delusterant such as titanium dioxide or an antioxidant such as mixture of 0.01% cupric acetate plus 0.1% potassium iodide, or a light stabilizer such as a manganous salt having a reducing anion may be employed.

Suitable polymerization procedures and reactants are described in U.S. Patents Nos. 2,071,250, 2,071,253, 2,130,523, 2,130,948, 2,163,636 and 2,278,878 and suitable spinning procedures are described in U.S. Patents Nos. 2,571,975, 2,217,743 and 2,253,089. The yarn can be cold drawn or hot drawn as desired, but cold drawing is preferred. A suitable cold drawing procedure is set forth in U.S. Patent No. 2,289,232.

The invention is broadly applicable to the preparation of polyamides generally by well-known reactions of suitable diamines and dicarboxylic acids or their equivalents.

A valuable class of suitable diamine comprises diamines of the general formula:

wherein R' is alkyl or hydrogen and R is a divalent hydrocarbon radical free from aliphatic unsaturation and of a chain length of at least 2 carbon atoms. Especially useful within this group are diamines in which R is $(CH_2)_x$ wherein $x$ is at least 4 and not greater than about 10. Another valuable class of suitable diamines comprises diamines of the general formula:

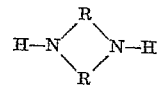

wherein R is defined as above. Especially useful within this class is piperazine.

A valuable class of dicarboxylic acids are the dicarboxylic acids of the general formula:

$$HOOC—(R'')_n—COOH$$

wherein R'' is a divalent hydrocarbon radical free from aliphatic unsaturation, with a chain length of at least 3 carbon atoms or with an aromatic ring structure, and $n$ is 0 or 1. Especially useful within this group are isophthalic acid and the dicarboxylic acids wherein R'' is $(CH_2)_y$ wherein $y$ is at least 3 and not greater than about 8.

The polyamides so prepared are polycarbonamides wherein the amide linkages are an integral part of the main polymer chain; they have the repeating unit:

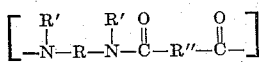

wherein R, R' and R'' are as defined above.

The following examples illustrate specific embodiments of the invention. All parts and percentages are by weight unless otherwise indicated.

The catalysts are usually added to the reaction mixture prior to the polymerization. They may be added to a reaction mixture which may be either one of a molten suitable diamine with a molten dicarboxylic acid (as described in U.S. Patent No. 2,840,547), or it may be a mixture in a solvent of a suitable diamine with a dicarboxylic acid, or it may be a mixture of the suitable reactants to comprise the prepolymer of a polyamide. However, the catalysts may be incorporated into the reaction mixture by suitable mixing at any later stage prior to that in which increase in polymerization rate is desired. The catalysts may be added as the actual salts or as equivalent amounts of the corresponding hydroxide and hypophosphorous acid, or the like.

EXAMPLE I

A number of polymerizations are carried out on a 100-pound scale. In each polymerization a 47% solution of hexamethylenediammonium adipate in water is evaporated to a 60% solution and then polymerized in hte presence of 0.01% cupric acetate together with 0.1% potassium iodide as antioxidant (based on the weight of polymer) and 0.02 mole percent of hypophosphite as a catalyst. Hypophosphites of K, Na, Li, Al, Mg, Ca, Ba, Zn, and Sr are so added, each to a separate 100-pound batch. A control polymerization, without catalyst, is included.

The autoclave is heated to 240° C. over a period of about 1 hour 20 minutes. In the same period, the autoclave pressure increases from atmospheric to 250 pounds per square inch (gauge). Then the autoclave pressure is reduced gradually to atmospheric pressure over a time period of about 90 minutes while the temperature is raised to 270° C. The autoclave is held at atmospheric pressure and 270–275° C. until the relative viscosity reaches a value of 41, which require additional time period of about 8 minutes for the catalyzed polymerizations and about 30 minutes for the control. The polymer, polyhexamethylene adipamide, is extruded from the autoclave in about 30 minutes. The term "relative viscosity," as used herein, is the ratio of the absolute viscosity in centipoises of an 8.4% solution of the polymer (in 90% formic acid) to the absolute viscosity of the solvent, both at 25° C.

The polyhexamethylene adipamide so prepared is in each case spun at a speed of 362 yards per minute and drawn to a 210 denier, 34 filament yarn bundle at a draw ratio of 4.9.

The number of broken filaments per pound of yarn is recorded in Table I, Column A. Here each break of an individual filament in the 34 filament bundle is counted as a break.

Table I

| Catalysts | Number of broken filaments per pound of yarn | |
|---|---|---|
| | A | B |
| None | 320 | 320 |
| Zinc hypophosphite | 320 | |
| Strontium hypophosphite | 280 | 280 |
| Barium hypophosphite | 850 | |
| Magnesium hypophosphite | 1,750 | |
| Calcium hypophosphite | 7,450 | |
| Aluminum hypophosphite | 10,600 | |
| Lithium hypophosphite | 19,100 | |
| Sodium hypophosphite | >100,000 | >100,000 |
| Potassium hypophosphite | >100,000 | |

Column A clearly shows the advantage of the catalysts of this invention (hypophosphites of Group 2) over the other catalysts (hypophosphites of Li, K, Na, Al) with respect to processabliity in the drawing operation.

In addition to the above experiments, three polymerizations are conducted without antioxidant (0.01% cupric acetate and 0.1% potassium iodide): the first without catalyst, the second with 0.02% strontium hypophosphite, and the third with 0.02% sodium hypophosphite. The results are recorded in Table I, Column B. It is found that the presence of the antioxidant does not affect the number of breaks, and does not add to or substract from the action of the catalyst.

Similar results are achieved when the following polyamides are made in the manner of Example I, using the antioxidant, a control, and each of the hypophosphites separately, and then processed and spun in said manner: polyoctamethylene oxamide, polyhexamethylene oxamide, polydecamethylene oxamide, polyhexamethylene sebacamide, polytetramethylene suberamide, polypentamethylene azelaamide, polyhexamethylene suberamide, polydecamethylene pimelamide and polyhexamethylene isophthalamide.

EXAMPLE II

Preparation of polyhexamethylene isophthalamide (6–I) is carried out with and without strontium hypophosphite polymerization catalyst following the procedure of Example I, but at a temperature of 265° C. The second order rate constant for the polymerization in the presence of 0.132 mole percent of strontium hypophosphite is $22.7 \times 10^{-5}$ when starting with an initial amine group concentration of 190.8 equiv. of end groups per megagram of hexamethylenediammonium isophthalate and an initial carboxyl group concentration of 65.1 equiv. of end groups per megagram. The corresponding rate constant for the polymerization without strontium hypophosphite catalyst is $4.06 \times 10^{-5}$ when starting with initial amine and carboxyl group concentrations of 199.6 and 74.6 equiv. of end groups per megagram. The units of the designated rate constants are megagrams/equivalents/minute. The catalyst increased the polymerization rate to 5.5 times the rate for the uncatalyzed reaction.

EXAMPLE III

Two polymerizations are carried out on a 500-pound scale following the techniques described in Example I. One polymerization without catalyst serves as a control while the other polymerization is catalyzed by addition of equivalent amounts of strontium hydroxide and hypophosphorous acid resulting in 0.024 mole percent strontium hypophosphite. The time required for the different steps is the same as in Example I. In both cases the polyhexamethylene adipamide is spun at 505 yards per minute and drawn, at a draw ratio of 5.09, to a 140 filament yarn bundle of 840 total denier. The control shows 0.15 break per pound and the yarn containing the strontium hypophosphite catalyst shows 0.08 break per pound. In this example, only breaks of the total yarn bundle are counted.

This example clearly shows the advantage of strontium hypophosphite catalyst in reducing the polymerization time while providing good drawing performance.

Within the scope of this invention is the use of either Ca, Sr, Ba, Mg, Zn or Cd hypophosphites (in concentrations from about 0.002 to about 0.2 mole percent) to prepare in the manner of Example I any of the following polyamides which are in copolymeric combination so that the combination is readily processed into yarn having low defect frequency in both spinning and drawing: polyhexamethylene oxamide, polyoctamethylene oxamide, polydecamethylene oxamide, polyhexamethylene adipamide, polyhexamethylene sebacamide, polytetramethylene suberamide, polypentamethylene azelaamide, polyhexamethylene suberamide, polydecamethylene pimelamide and polyhexamethylene isophthalamide.

Also within the scope of this invention is the use of either Ca, Sr, Ba, Mg, Zn, or Cd hypophosphites (in concentrations from about 0.002 to about 0.2 mole percent) to prepare in the manner of Example I any of the following polyamides which are in copolymeric combination (with melting point below 350° C.) so that they are readily processed into yarn having low defect frequency in both spinning and drawing: either polyhexamethylene terephthalamide, or polyhexamethylene bibenzoamide, copolymerized with either polyhexamethylene adipamide, polydecamethylene oxamide, polyhexamethylene oxamide, polyoctamethylene oxamide, polyhexamethylene sebacamide, polytetramethylene suberamide, polypentamethylene azelaamide, polyhexamethylene suberamide, polydecamethylene pimelamide or polyhexamethylene isophthalamide.

Since many different embodiments of the invention may be made without departing from the spirit and scope thereof, it is to be understood that the invention is not limited by the specific illustrations except to the extent defined in the following claims.

I claim:

1. In a process for preparing a fiber-forming polyamide by polymerizing the salt of a member of the group consisting of dibasic carboxylic acids of the formula HOOC—(R″)$_n$—COOH and their amide-forming equivalents, wherein R″ is a divalent hydrocarbon radical free from aliphatic unsaturation and $n$ is 0 or 1, with an organic diamine free from aliphatic unsaturation whose amino nitrogens carry at least one hydrogen atom and are attached to carbon atoms which are attached to other carbon atoms, there being from 2–10 of the latter in the chain between said amino nitrogens, the improvement for markedly increasing the rate of polyamidation with production of polyamide readily processed into yarn having low defect frequency in both spinning and drawing which comprises conducting said polymerization in the presence of an amount of from about 0.002 to about 0.2 mole percent, based on the weight of said salt, of a hypophosphite of a metal selected from the group consisting of strontium, zinc, barium, magnesium, calcium and cadmium.

2. The process of claim 1 in which the catalyst is zinc hypophosphite.

3. The process of claim 1 in which the catalyst is strontium hypophosphite.

4. The process of claim 1 in which the diamine has the structural formula:

wherein R′ is alkyl or hydrogen and R is a divalent hydrocarbon radical free from aliphatic unsaturation and of a chain length of at least 2 carbon atoms.

5. The process of claim 1 wherein the diamine is

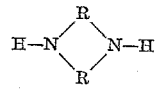

wherein R is a divalent hydrocarbon radical free from aliphatic unsaturation and of a chain length of at least two carbon atoms.

6. The process for preparing a polyamide which comprises heating an aqueous solution of hexamethylenediammonium adipate in the presence of a metal hypophosphite polyamidation catalyst to form polyhexamethylene adipamide, the catalyst being a hypophosphite of a metal of Group 2 of the Periodic table, having an atomic weight between 23 and 138, and being present in an amount of about 0.002 to bout 0.2 mole percent based on the weight of the hexamethylenediammonium adipate.

7. The process of preparing a polyamide which comprises heating an aqueous solution of hexamethylenediammonium isophthalate in the presence of a metal hypophosphite polyamidation catalyst to form polyhexamethylene isophthalamide, the catalyst being a hypophosphite of a metal of Group 2 of the Periodic Table, having an atomic weight between 23 and 138, and being present in an amount of about 0.002 to about 0.2 mole percent based on the weight of the hexamethylenediammonium isophthalate.

8. In the polymerization of nylon from the polycarbonamide-forming salt of at least one diamine and at least one dicarboxylic acid, both free from aliphatic unsaturation, the addition of said salt of from 0.002–0.2 mole percent, based on the weight of said salt, of a catalyst selected from the group consisting of strontium, zinc, barium, magnesium, calcium and cadmium hypophosphites.

9. In the polymerization of nylon from the polycarbonamide-forming salt of a saturated aliphatic diamine and a saturated aliphatic dicarboxylic acid, the addition to said salt of from 0.002–0.2 mole percent, based on the weight of said salt, of a catalyst selected from the group consisting of strontium, zinc, barium, magnesium, calcium and cadmium hypophosphites.

References Cited in the file of this patent

UNITED STATES PATENTS

| | | |
|---|---|---|
| 2,163,636 | Spanagel | June 27, 1939 |
| 2,510,777 | Gray | June 6, 1950 |
| 2,557,808 | Walker | June 19, 1951 |
| 2,564,001 | Genas | Aug. 14, 1951 |

FOREIGN PATENTS

| | | |
|---|---|---|
| 793,132 | Great Britain | Apr. 9, 1958 |
| 112,186 | Australia | Jan. 9, 1941 |